(12) United States Patent
Karmarkar

(10) Patent No.: US 7,580,719 B2
(45) Date of Patent: Aug. 25, 2009

(54) SMS+: SHORT MESSAGE SERVICE PLUS CONTEXT SUPPORT FOR SOCIAL OBLIGATIONS

(75) Inventor: Amit Karmarkar, Palo Alto, CA (US)

(73) Assignee: U Owe Me, Inc, Palo Alto, CA (US)

( * ) Notice: Subject to any disclaimer, the term of this patent is extended or adjusted under 35 U.S.C. 154(b) by 622 days.

(21) Appl. No.: 11/231,575

(22) Filed: Sep. 21, 2005

(65) Prior Publication Data

US 2007/0067398 A1   Mar. 22, 2007

(51) Int. Cl.
*H04W 4/00*   (2006.01)

(52) U.S. Cl. .................. 455/466; 370/328; 370/349; 370/496; 370/522

(58) Field of Classification Search ............. 455/466; 370/328, 349, 496, 522
See application file for complete search history.

(56) References Cited

U.S. PATENT DOCUMENTS

| | | | | |
|---|---|---|---|---|
| 4,959,785 | A * | 9/1990 | Yamamoto et al. | 715/234 |
| 5,517,409 | A * | 5/1996 | Ozawa et al. | 704/3 |
| 5,797,098 | A * | 8/1998 | Schroeder et al. | 455/464 |
| 6,473,621 | B1 * | 10/2002 | Heie | 455/466 |
| 6,560,456 | B1 * | 5/2003 | Lohtia et al. | 455/445 |
| 6,731,940 | B1 * | 5/2004 | Nagendran | 455/456.1 |
| 6,785,869 | B1 * | 8/2004 | Berstis | 715/210 |
| 6,813,507 | B1 * | 11/2004 | Gress et al. | 455/466 |
| 6,816,578 | B1 | 11/2004 | Kredo et al. | |
| 6,963,839 | B1 | 11/2005 | Ostermann et al. | |
| 6,964,020 | B1 * | 11/2005 | Lundy | 715/210 |
| 6,966,035 | B1 | 11/2005 | Suess et al. | |
| 6,993,553 | B2 * | 1/2006 | Kaneko et al. | 709/201 |
| 7,177,902 | B2 * | 2/2007 | Hubbard | 709/203 |
| 7,207,004 | B1 | 4/2007 | Harrity | |
| 7,254,773 | B2 | 8/2007 | Bates et al. | |
| 7,272,406 | B2 * | 9/2007 | Chava et al. | 455/466 |
| 7,293,074 | B1 * | 11/2007 | Jellinek et al. | 709/218 |
| 7,305,230 | B2 * | 12/2007 | Zhigang | 455/414.1 |
| 7,315,902 | B2 * | 1/2008 | Kirkland | 709/247 |

(Continued)

OTHER PUBLICATIONS

"About ContractBuddy"; http://www.contractbuddy.com/aboutCB/features.htm Mar. 22, 2005.

(Continued)

*Primary Examiner*—Lester Kincaid
*Assistant Examiner*—Diego Herrera
(74) *Attorney, Agent, or Firm*—Raj Abhyanker LLP

(57) ABSTRACT

A Short Message Service (SMS) enables a sender to send an asynchronous short message (often informal) from his source device to one or more receiving devices that are specified by the sender and represent one or more recipients. The SMS associates with each particular short message specific context information about that particular message (including its originator, recipient, type, reason for sending, and the sending time). The SMS may associate further specific context information it has already about previous messages or previously-established links and patterns, without further input from the sender, and display that associated specific context information to the recipient. By parsing and analyzing the combined asynchronous short message and its associated specific context information, using cultural, linguistic, and reverse-association means, a SMS can provide context-driven support for any social or formal obligation(s) conveyed by an individual short message.

38 Claims, 7 Drawing Sheets

U.S. PATENT DOCUMENTS

| | | | |
|---|---|---|---|
| 7,366,500 B1 * | 4/2008 | Yalovsky et al. | 455/414.1 |
| 7,424,682 B1 | 9/2008 | Pupius et al. | |
| 2002/0077135 A1 * | 6/2002 | Hyon | 455/466 |
| 2002/0173294 A1 * | 11/2002 | Nemeth et al. | 455/412 |
| 2002/0187794 A1 * | 12/2002 | Fostick et al. | 455/466 |
| 2002/0193996 A1 | 12/2002 | Squibbs et al. | |
| 2002/0198715 A1 | 12/2002 | Belrose | |
| 2003/0023424 A1 | 1/2003 | Weiner | |
| 2003/0078033 A1 * | 4/2003 | Sauer et al. | 455/412 |
| 2003/0085989 A1 * | 5/2003 | Tay | 348/14.02 |
| 2003/0125927 A1 * | 7/2003 | Seme | 704/3 |
| 2003/0144895 A1 * | 7/2003 | Aksu et al. | 705/9 |
| 2003/0186716 A1 * | 10/2003 | Dorenbosch et al. | 455/519 |
| 2003/0207701 A1 * | 11/2003 | Rolnik et al. | 455/564 |
| 2003/0236658 A1 | 12/2003 | Yam | |
| 2004/0024683 A1 * | 2/2004 | Morciniec et al. | 705/37 |
| 2004/0034561 A1 * | 2/2004 | Smith | 705/14 |
| 2004/0044517 A1 | 3/2004 | Palmquist | |
| 2004/0102201 A1 * | 5/2004 | Levin | 455/466 |
| 2004/0102956 A1 * | 5/2004 | Levin | 704/2 |
| 2004/0110493 A1 * | 6/2004 | Alvarez et al. | 455/414.1 |
| 2004/0122979 A1 | 6/2004 | Kirkland | |
| 2004/0158471 A1 * | 8/2004 | Davis et al. | 704/277 |
| 2004/0179545 A1 * | 9/2004 | Erola et al. | 370/449 |
| 2004/0194141 A1 * | 9/2004 | Sanders | 725/53 |
| 2004/0215526 A1 * | 10/2004 | Luo et al. | 705/26 |
| 2004/0221256 A1 | 11/2004 | Martin et al. | |
| 2004/0221260 A1 | 11/2004 | Martin et al. | |
| 2004/0235503 A1 * | 11/2004 | Koponen et al. | 455/466 |
| 2004/0248591 A1 * | 12/2004 | Fish | 455/456.3 |
| 2004/0266462 A1 * | 12/2004 | Chava et al. | 455/466 |
| 2005/0003837 A1 * | 1/2005 | Midkiff et al. | 455/466 |
| 2005/0004840 A1 * | 1/2005 | Wanninger | 705/14 |
| 2005/0027608 A1 * | 2/2005 | Wiesmuller et al. | 705/26 |
| 2005/0038892 A1 * | 2/2005 | Huang et al. | 709/227 |
| 2005/0066044 A1 * | 3/2005 | Chaskar et al. | 709/230 |
| 2005/0128967 A1 * | 6/2005 | Scobbie | 370/310 |
| 2005/0171944 A1 | 8/2005 | Palmquist | |
| 2005/0191963 A1 * | 9/2005 | Hymes | 455/41.2 |
| 2005/0198304 A1 * | 9/2005 | Oliver et al. | 709/227 |
| 2006/0135181 A1 * | 6/2006 | Dale et al. | 455/456.5 |
| 2006/0167992 A1 * | 7/2006 | Cheung et al. | 709/204 |
| 2007/0027673 A1 * | 2/2007 | Moberg | 704/9 |
| 2007/0076877 A1 * | 4/2007 | Camp et al. | 380/255 |
| 2007/0208813 A1 | 9/2007 | Blagsvedt et al. | |
| 2008/0059152 A1 | 3/2008 | Fridman et al. | |
| 2008/0133228 A1 | 6/2008 | Rao | |

OTHER PUBLICATIONS

"Electronic negotiations, media, and transactions in socioeconomic interactions"; Yuan; http://interneg.org/enegotiation/resources/online_info.html Mar. 22, 2005.

1996 IEEE Int'l Conf. on Systems, Man, and Cybernetics; Information Intelligence and Systems; vol. 1, p. 802-807.

"What Can Computer Programs Do To Facilitate Negotiation Processes?"; Chaudhury, et al.: 1991 ACM 0-89791-456-2/91/0010/0269.

"Speech Centric Multimodal Interfaces for Mobile Communication Systems"; Kvale et al.; Telektronikk 2.2003; p. 104-117.

"Google SMS: How to Use"; http://www.google.com/sms/howtouse.html Feb. 4, 2005.

\* cited by examiner

SMS+: SHORT MESSAGE SERVICE PLUS CONTEXT SUPPORT FOR SOCIAL OBLIGATIONS

BACKGROUND OF THE INVENTION

1.A. Field of the Invention

This invention is in the field of Short Message Services, and more specifically, the field of implementations of the same devised to provide for SMS users, effective, visible, and comprehensible interpretations of consequential and cultural meanings for short messages whose bare substance, without contextual information, may be inadequate to prompt from the recipient the results or responses that the sender intended. This invention makes no claim for physical transmission, storage, or reproduction machinery or mechanisms, used to handle a Short Message (SM; in the plural, SMs), presuming the existence and availability of such physical means as well-established in the prior art, whether such be a Morse telegraph or a Blackberry wireless text message and pager.

1.B. Description of the Related Art

Short Message Services (SMS) have been implemented in wireless telephone communications systems as a way to send a message to a subscriber's wireless phone or other device. SMS messages have become quite popular recently, due in part from wireless telephone service providers offering SMS as a free service in conjunction with wireless telephony services; hence, many wireless subscribers have developed a preference to communicating using SMS as opposed to more costly wireless voice services. A messaging server, also referred to as a Short Message Service Center (SMSC), is configured for receiving an SMS message from a messaging source according to Short Message Peer to Peer Protocol (SMPP). The messaging source may be, for example, a cellphone supplying a user-input message, or an e-mail interface resident within the wireless telephone communications system. The SMSC, in response to receiving the SMS message from the messaging source, transmits a short message to the cellular phone based on the destination telephone number specified within the notification message. However, this arrangement still provides only limited flexibility in enabling different sources to send an SMS message to a cellular phone. In addition, existing cellphones are limited by memory to storing up to ten SMS messages. Moreover, this arrangement limits the ability of an SMS subscriber having a cellphone to send messages to a destination that does not have an SMS-capable cellphone.

The Short Message Service (SMS) allows wireless subscribers and service providers to send alphanumeric messages of limited length (approximately 150 characters). Subscribers may send or receive email messages via SMS. The wireless network may route email and other text messages to subscribers via the SMS. SMS is supported by GSM and other mobile communications systems and is similar to paging; however, delivery of SMS messages do not require the mobile phone to be active and within range, as messages are held in SMS Centers until the phone is active and within range. In this way SMS offers guaranteed delivery of messages. SMS messages are transmitted within the same cell or to anyone with roaming service capability. They can also be sent to digital phones from a Web site equipped with PC Link or from one digital phone to another.

Typical uses of SMS today include interpersonal communication and notifying services to mobile phone owners. These notification services include message notifications related to arrival of voicemail, email and fax messages, and reminder services. The SMS messages may contain preselected information, such as stock quotations or weather forecasts. In the prior art, SMS messages comprising preselected information are sent at predetermined intervals, such as at a certain time of day or when certain events occur.

However, most messages between individuals—particularly those which are both limited in length and asynchronous, two defining features of any SM—both are still informal and also rely on combined contextual and cultural knowledge for accurate interpretation and to have any consequential effect upon the recipient. In that sense, the human recipient is and must remain entirely in the processing loop. To date, no one has focused on the ability of a SMS to serve as an assistant to the human user in correctly comprehending the contextual and cultural linkages that the sender desired to associate with the SM sent. The closest that any have come is found in Application 20030144895, Asksu, et al., "Prepaid Personal Advisory Service for Cellular Networks", that uses SMS keyword-matching exchanges to identify and qualify potential and available experts, but requires bridging, full human-to-human telephone contact, as the application explicitly states in ¶0016: "It is a further aspect of the present invention to establish a telephone connection between the customer and the selected expert."

Prior Art Distinguished

The message-implementing aspects of the background field have focused on the need to solve the lack of a common protocol amongst either pre-existing, switched-circuit, Plain Old Telephone Service ('POTS') or the multiple, conflicting, and above-all proprietary protocols associated with the existing voice mail systems.

Short Message Service implementations chiefly have focused on the means for providing Short Message services, for linking Short Message services to binding, formal commitments (such as using SMS to automatically purchase products, request services or information, or make other binding commitments), or for enabling a SMS sender to commit himself to an automated response. What is missing from all of these is any conception of the communication involving the human recipient in the interpretation and continuation of the social contact and activities consequential to the receipt and viewing of the transmitted short message; equally missing, is any conception of assisting (rather than replacing, eliminating, or supplanting) the recipient as part of the communication process.

For example, in U.S. Pat. No. 6,560,456, Lohtia et al., "System And Method For Providing Subscriber-Initiated Information Over The Short Message Service (SMS) Or A Microbrowser", there is no human recipient of the SM. The sender is the recipient of the response, and the invention focuses on retrieving and sending automated information responses to inquiries to the original sender. As the sender possesses the original context for the entire transaction, the invention assumes implicitly a complete lack of need or use for providing such assistance.

Then in U.S. Pat. No. 6,813,507, Gress, et al., "Unified Messaging System Having Short Message Service Command Processor", the inventors focus on resolving the problems that met:

"a need for an arrangement that enables open standards-based unified messaging systems to utilize SMS messages as a command interface."

The focus here is again on the automated response, this time of a receiving device, to a sender's SM, as the patent clearly states:

"In particular, there is a need for an arrangement that enables a unified messaging system to parse executable commands from a received SMS message, enabling unified messaging operations to be performed for an SMS messaging subscriber.

There also is a need for an arrangement that enables a user to perform unified messaging operations, including retrieval of messages, by sending SMS messages to a unified messaging system.

These and other needs are attained by the present invention, where a unified communications system includes an SMS command processor configured for executing prescribed messaging operations based on reception of an SMS message having respective prescribed commands."

The idea of using a particular Short Message's associated contextual information to provide meaning and assistance to that Short Message's recipient(s) is entirely absent from Gress. Gress focuses on effecting the device(s) to which a Short Message is sent as desired by the sender, rather than on a human user other than the sender.

In pending application 2004/0024683 by Morcinicc et al., "Apparatus And Method Of Communicating Changes In States Of Contractual Responsibilities", the inventors consider the value of communicating a state-oriented value of "commitment data" concerning contractual responsibilities. The inventors presume the existence (¶0012) of a both "an agreed commitment model" and "a commitment state store that forms a part of the commitment model". While the inventors conceivably could use a SM as "an agreed messaging protocol" required by the invention, they fail to see any need to include either such a SM's contextual data or to assist the recipient in individually interpreting that SM, as the inventor's apparatus and method presumes that a known and previously agreed upon model governs all interpretations. This application requires ("introduces", ¶0021) "a state centric model of contractual commitments". However, in the real world, multiple interpretations dependent upon the parties' varying cultural norms may negate such a presumption at the very start. In such circumstances contextual assistance may be required, not merely desirable, to indicate to each party the other's presumptive view of the current and actual 'state' of the interaction between them. Furthermore, the invention does not consider the value of associated, but indirect, or post-performance activities which are not strictly required by the 'model of contractual commitments' yet which human concerns may render desirable. A final and significant point of difference is that contractual commitments and a known contractual model both require determinate and fixed language points, and are usually completely helpless at dealing with the rapidly-evolving and ever-changing social slang which, particularly in an SM or IM ("Instant Message") environment, are the reality of human interactivity and intercommunication.

In pending application 20020187794 by Fostick, et al., "SMS Automatic Reply And Automatic Handling", the inventors focus on a system that can enable improved management of SMS messages, and in particular enabling automatic replies, forwarding and filtering of SMS messages. Here there is no conception of assisting the recipient, chiefly because the recipient is merely the intended final target of the improved inter-transit handling.

Finally, in pending application 2005/0027608, Weismuller et al., "System And Method For Providing Commercial Services Over A Wireless Communication Network", these inventors provide no contextual filling or assistance to any SM recipient, presume the transaction includes a purchase of service from the service provider through a SM, and focuses on service-to-user transactions, rather than on sender-to-user communication of intentions and agreements, whether formal or informal. In the eyes of the inventors, the service is hierarchical, from the central service to the peripheral users, rather than a peer-to-peer exchange.

SUMMARY OF THE INVENTION

A Short Message Service allows a sender to send an asynchronous and informal Short Message from his originating source device to one or more receiving devices specified by the sender, which represent one or more recipients. The SMS passes the SM through a parser that consults with both linguistic and cultural databases to generate the intended meaning for the text; associates with each particular SM its specific context information (including the originator, recipient, type of message, reason for the message, and its sending and reception times); optionally passes the SM through a comparative analyzer that, depending on previously-established and stored links and patterns from prior like SMs, may associate further specific context information according to without requiring input from the sender; and forwards the base SM text to the recipient along with means for the recipient to also pull up, on request, the associated information (contextual and comparative) in order to allow the recipient to comprehend the intended meaning of the sender's original text, thereby providing through the SMS context-driven support for asocial or formal obligation formed through the informal SM message.

In a further extension of the invention the SMS uses the same parsing, context, and analysis to provide additional support or opportunities for deeper interaction through third-party offers to both sender and recipient, such as the provision of geographically and temporally appropriate coupons for jointly desirable associated services.

DESCRIPTION OF THE DRAWINGS

Solid Lines Indicate Developments within an Element; Dashed Lines Indicate Information and Action being Transmitted between Elements

In FIG. 6 the first SM is sent at short range from Sender's unit [71] to Recipient's unit [73] directly. The SMS software detects the face-to-face mode [74] and links the two users' unique IDs to the SM [76], leaves a copy of the SM with a unique ID link on the each of the Sender's unit [75] and Recipient's unit [77]; and enters the other unit's unique ID onto a list of 'current contacts' for that unit (Sender's unit's list, [78]; Recipient's unit's list, [79]). Thus, the Sender's unit will include the Recipient's ID, and the Recipient's unit will include the Sender's ID. After this exchange Sender and Recipient part company for some time.

Figure 1:
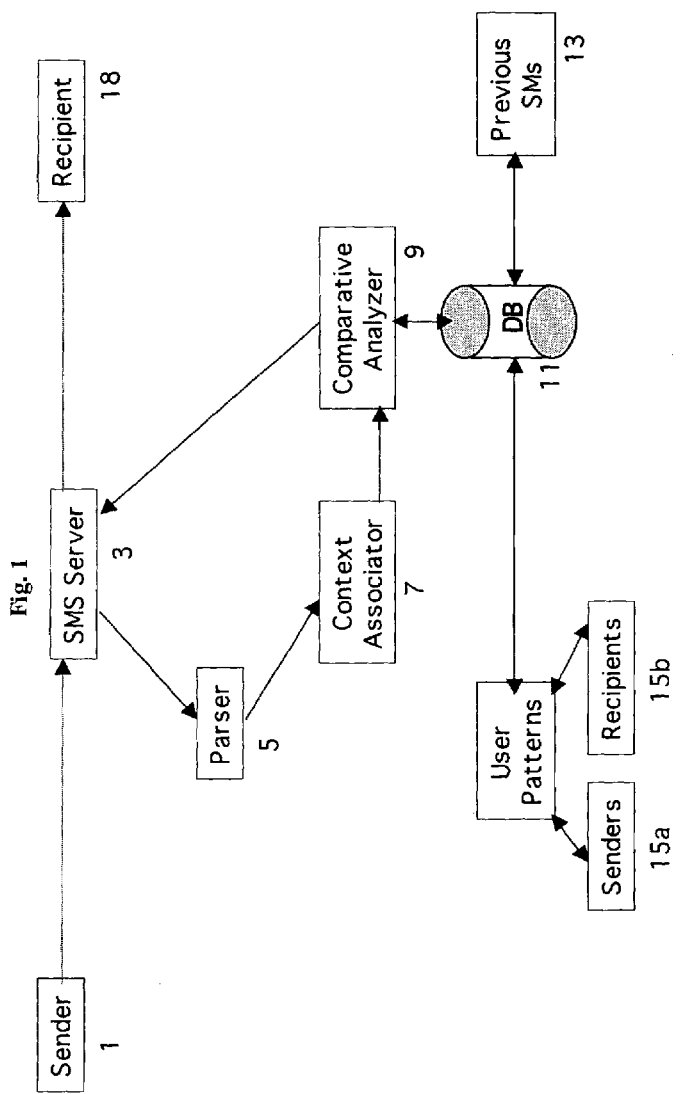
FIG. 1 is a diagram of the process for a particular SM through the SMS. A Short Message (SM), is sent from the Sender [1] to a SMS server [3], where the SM passes through a Parser [5], then through a Context Associator (7) that associates and makes explicit at the user-level the contextual information associated with the SM, then in the preferred embodiment. before the SM is sent to the Recipient [18], takes the optional additional step through a Comparative Analyzer [9] that matches and incorporates this SM with a database [11] that contains both previous SMs [13] naming a User (Sender or Recipient) and, for each User, patterns [15a, Senders and 15b, Recipients] derived from analysis of each SM's context.
Figure 2:
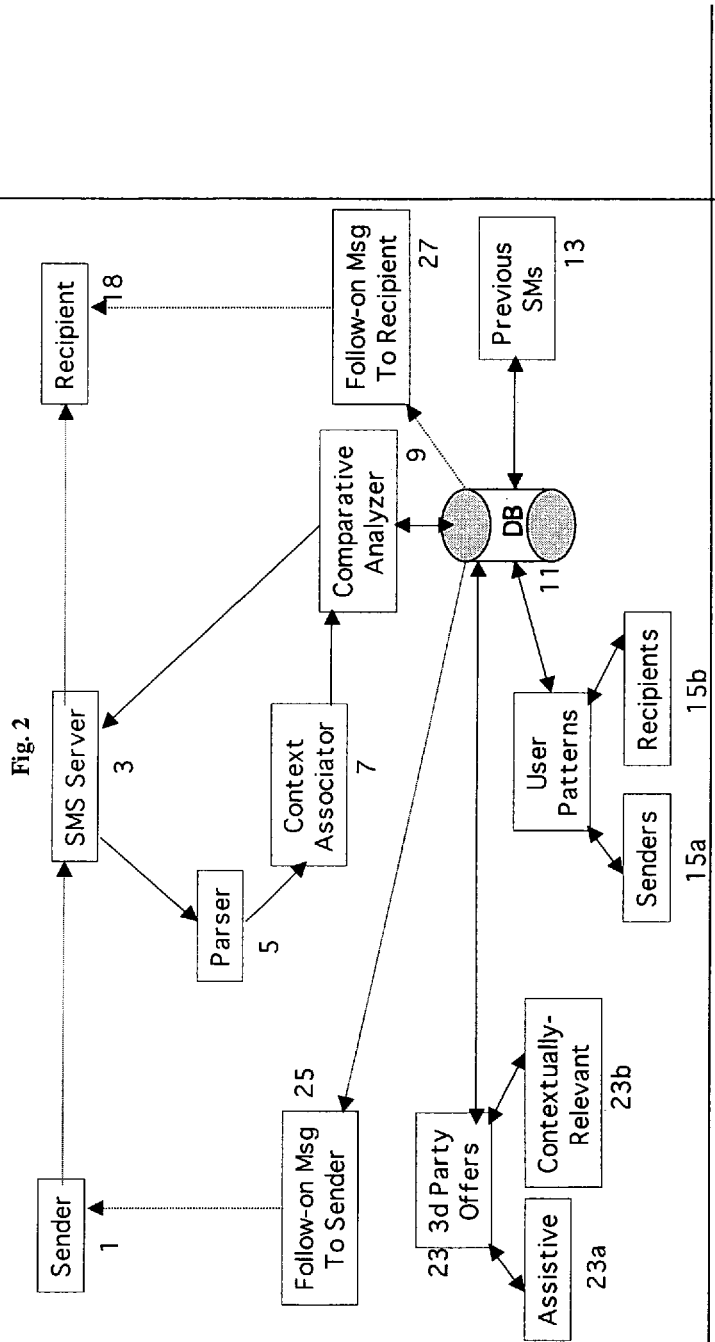
FIG. 2 is a diagram of a further process where the comparative analyzer searches through the database [11] that also includes third-party offers [23], optionally differentiating between assistive [23a] or contextually-relevant [23b] offers, and upon finding any such, generates and sends to each of Sender and Recipient a follow-on message incorporating that offer (respectively, [25] and [27]).
Figure 3:
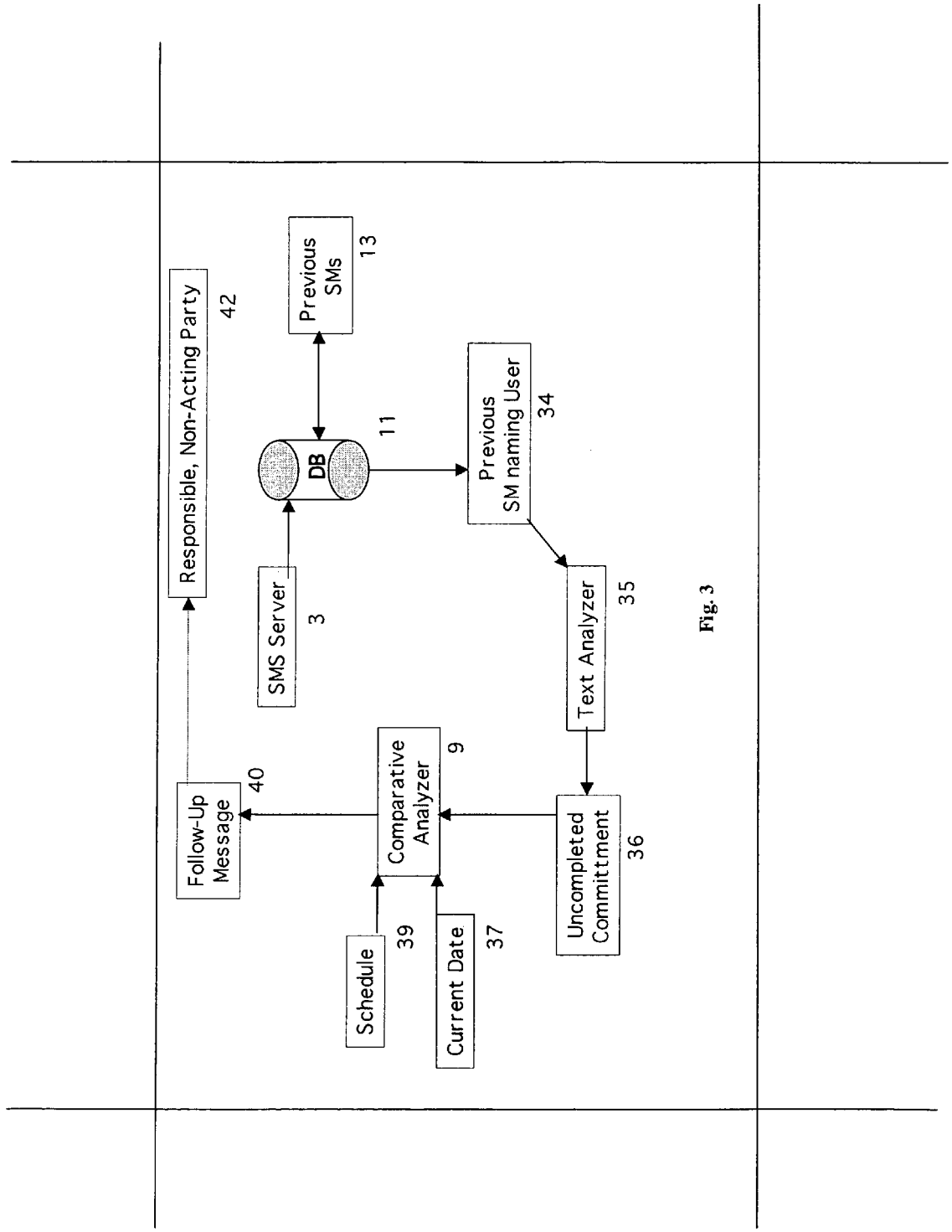
FIG. 3 is a diagram of a further embodiment where the SMS Server [3] periodically reviews for each User, who may be either or both Sender or Recipient, the SMS Database [11] containing previous SMs [13], and, for each SM found naming that User [34], passes the SM through a Text Analyzer [35] that analyzes the SM for an uncompleted commitment [36]; upon finding such, matches the SM's context to the current date [37] and according to a schedule [39], generates a follow-up message [40] to the responsible but non-acting party [42].
Figure 4:
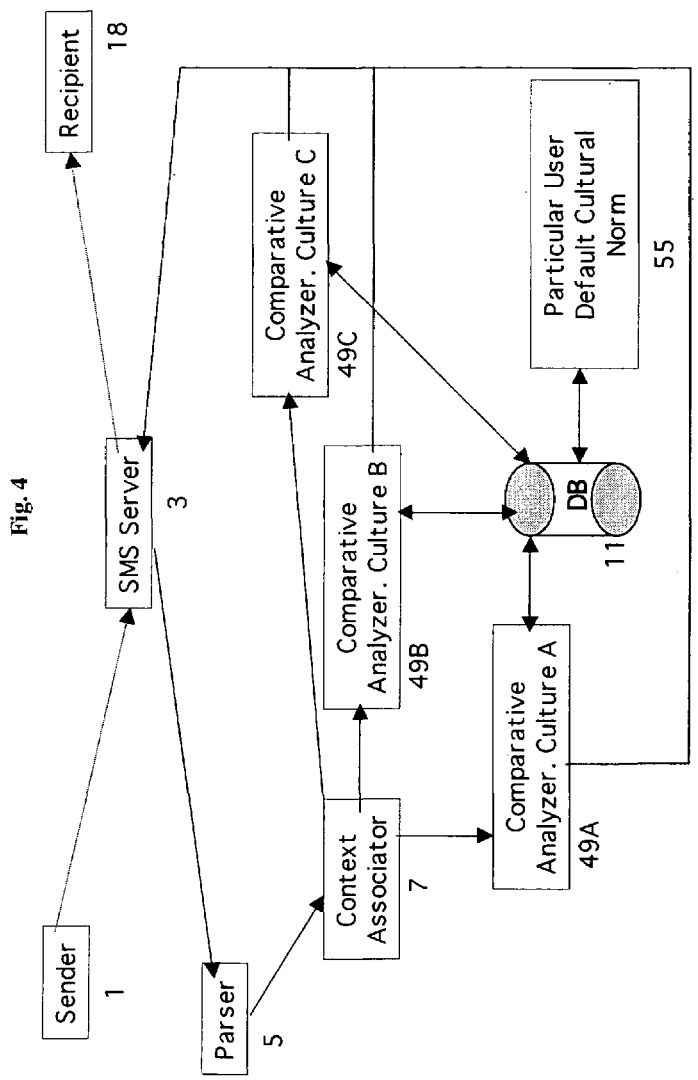
FIG. 4 is a diagram of a SMS containing multiple comparative analyzers, each comparative analyzer incorporating a particular cultural norm (Culture A, Culture B, and Culture C, and [49A], [49B], [49C], respectively), where the database [11] also contains for each User a record of that User's default cultural norm ('Default') [15c].
Figure 5:
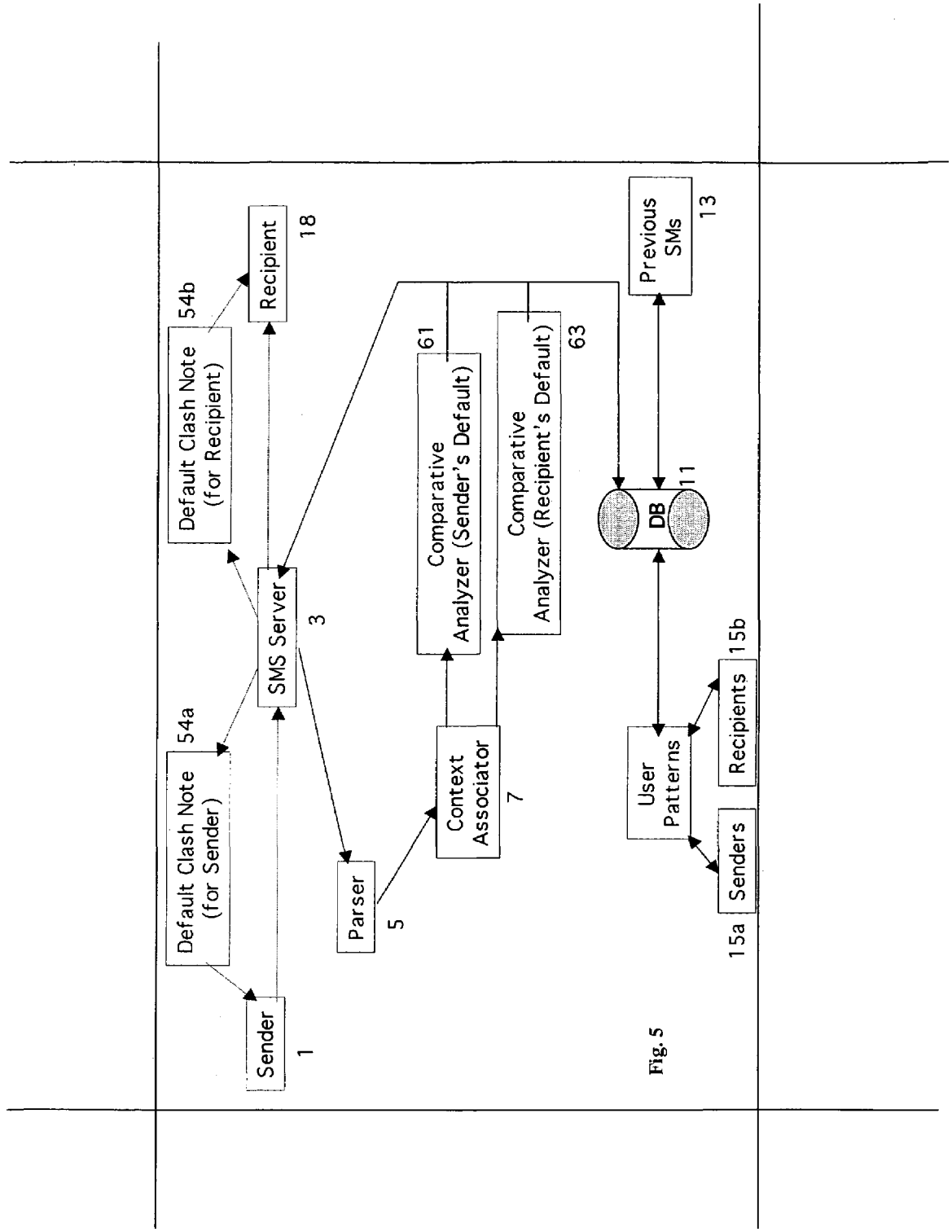
FIG. 5 is a diagram of the process for what happens when the SMS identifies a clash between the default cultural norms of Sender [61] and Recipient [63]. An additional Default Clash Note indicating both the existence of the clash and of the Sender's Default [54a] is associated with the SM sent to the Recipient [18], while a reciprocal Default Clash Note indicating both the existence of the clash and of the Recipient's Default [54b] is returned to the Sender [59].
Figure 6:
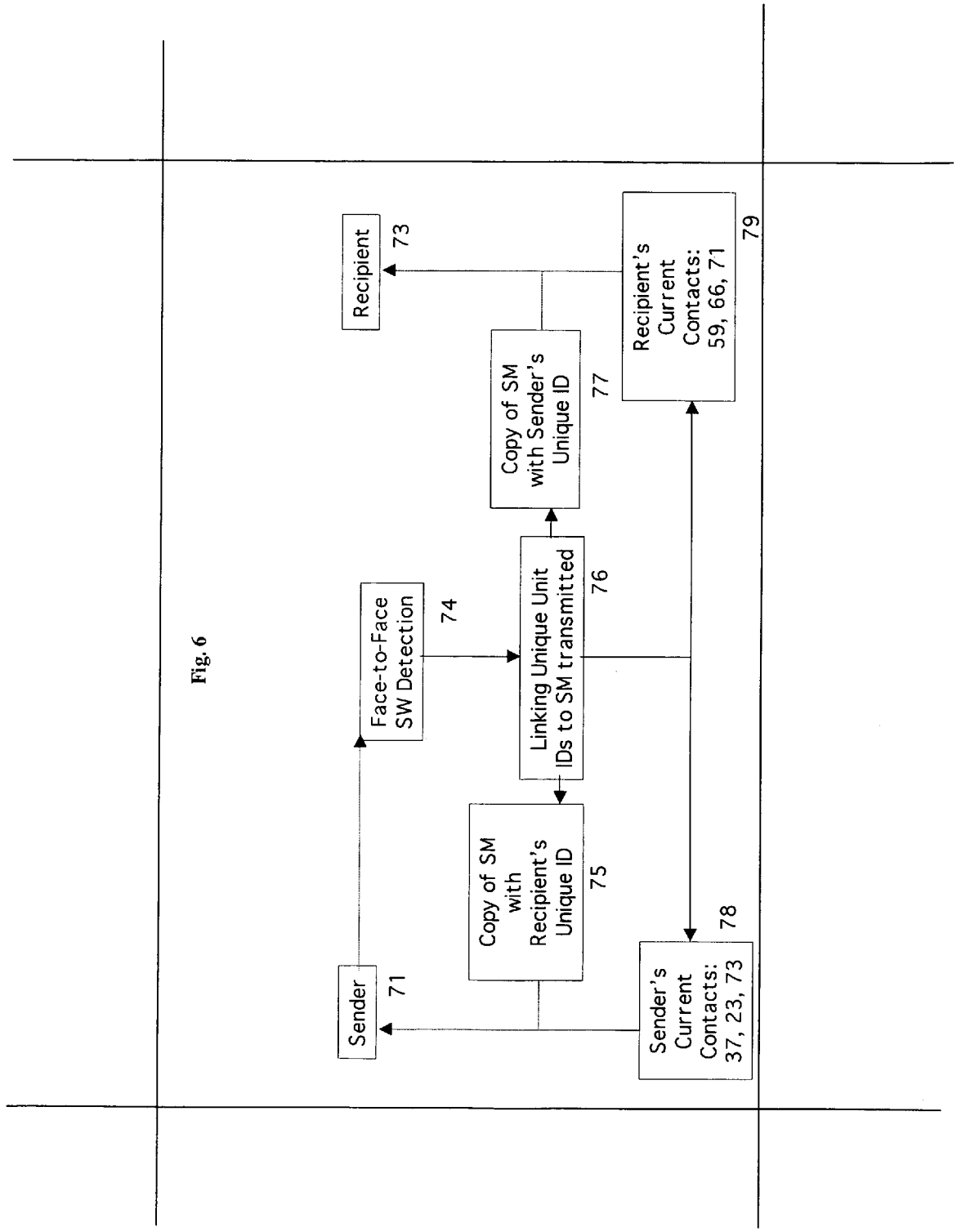
FIGS. 6 and 7 are a diagram of the process for an immediate-range, face-to-face interaction set.
Figure 7:
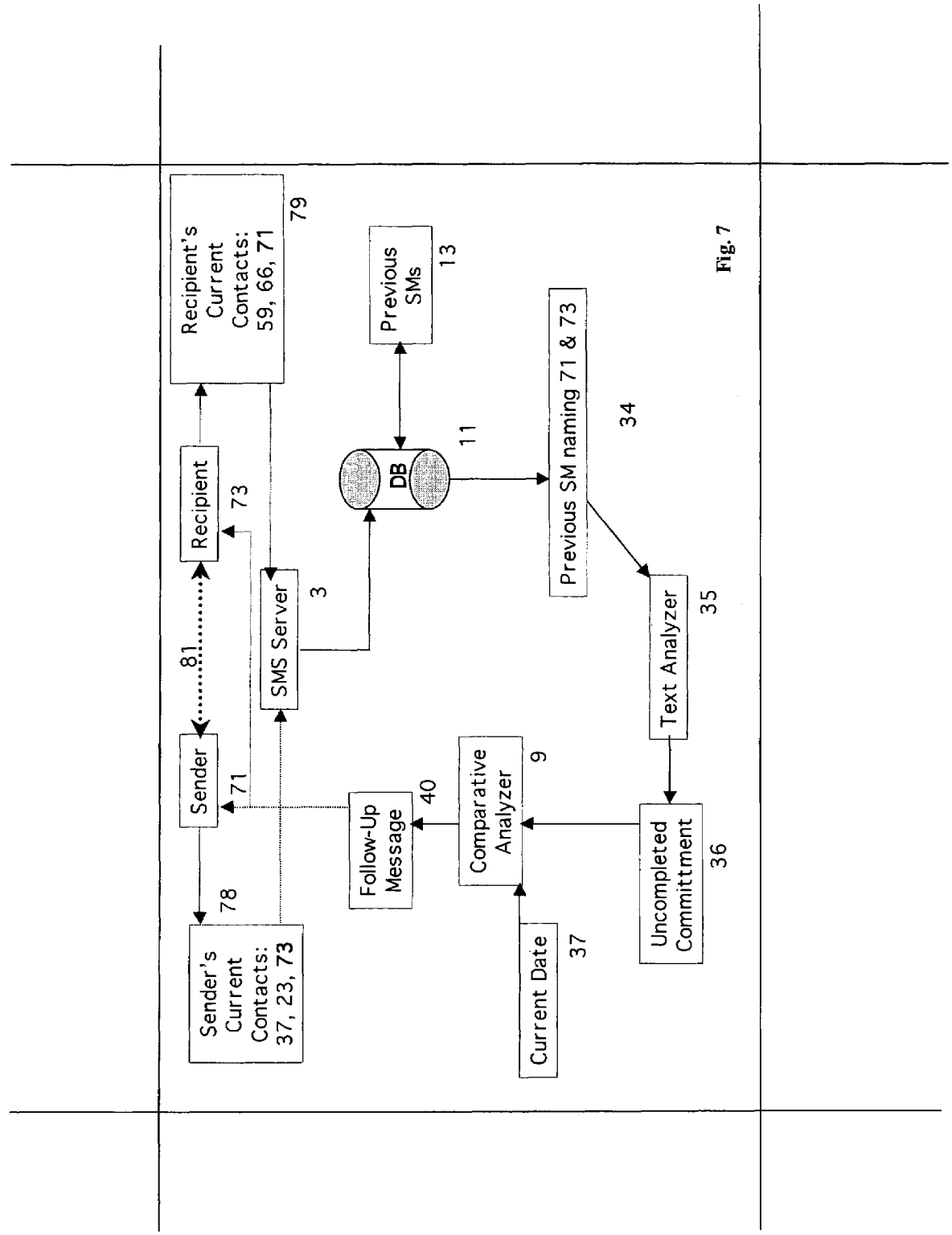

When, as shown in FIG. 7, the Sender's Unit [71] and Recipient's unit [73] once more come within immediate-range, face-to-face co-locality, the units use standard detection software such as Bluetooth to become alerted to each others' presence [81]. Each unit compares the now-present unique unit ID against its list of current contacts [78, 79]; and upon finding a match (indicated by bold lettering in the drawing), sends the original message to the SMS server [3], which both handles the SM as disclosed in FIGS. 1-2 and also examines the SMS Database [11] containing previous SMs [13], and, for each SM found naming that pair of now-present unique unit IDs, passes the SM through a Text Analyzer [35] that analyzes the SM for an uncompleted commitment [36]; upon finding such, matches the SM's context to the current date [37] and generates a follow-up message [40] to both Sender [73] and Recipient [73]

DETAILED DESCRIPTION

A Short Message Service (SMS) provides and supports communication linking its users. In every message, the Core Text thereof is only a part of the communication, though it is the element most commonly thought to comprise the communication. For example, the short phrase "I need you" has those three words as its Core Text. That communication communicates both the existence of a need and the existence of a connection between the individuals referenced by the pronouns (who are presumed, in the absence of a mirror and a solipsistic utterance, to be distinct). In a multi-media communication, the accompanying sound and visual image(s) of a communication's Core Text may greatly transform the meaning of the message, emphasizing or even inverting the meaning.

Contextual information associated with each message (its sender, recipient(s), time, and format) is another, equally important part of the communication. Contextual information is usually implicit or indicated by subordinate text or structures. For example, if to the previous phrase "I need you" there were an associated recipient header of "Dr. Watson" such that the message read: "[To: Dr. Watson] I need you", then the communication indicates 'you' should be bound to 'Dr. Watson', while the subject pronoun "I" indicates to whom Dr. Watson should respond (presumably, a person known to or immediately perceivable by Dr. Watson). Adding on a second header indicating the sender, the message becomes more specific: "[From: Alexander Graham Bell] [To: Dr. Watson] I need you", allows both pronouns to be associated to the intended individual. A great deal of human ingenuity and time has gone into both reducing the need to overtly incorporate contextual information into the Core Text and coping with confusion by explicitly adding just enough to enable an overly-contracted communication to be understood. Frequency-differentiation can replace 'Tower, this is Flight 451' and the every-useful phrase colorfully highlighted by Robert De Niro ("You talkin' to me?") are respective examples of such adaptations.

Finally, social patterns and situational context associated with each message form a final, and also important, part of each message. For example, the fact that this particular message, "I need you", took place in a laboratory where the sender and recipient were regularly working with dangerous substances, distinguished the message as being one expressing an immediate and particular need for presence, from being one expressing a theoretical or economic statement of condition, or one indicating an emotional valuation of fellowship. One suspects the tone of voice may have also had some import . . . .

A Short Message Service that transmits only the first-mentioned part of a communication—the Core Text—may initially prosper simply due to is users' need to use the SMS even more to establish through explicit Core Text messaging the second and third associational elements. However, this will incur some cost in delay and consequences to the users. ("Did you send that last call?" "Yes I did." "Did you mean to send it to me?" "Yes, of course—who else is on this line?" "What did you mean by 'need', Dr. Bell?" "Aaarrrgh!")

There is a value to a Short Message Service which can provide and make explicit the contextual and associational information to assist a Core Text message's recipient comprehend the meaning of a single Short Message without requiring further intercommunication, a SMS that assists and supports human-centered encoding.

Definitions

Context Metadata Elements of a SM that enable transmission of the Core Text from a sender to one or more recipients. These may include the identification of Sender and Recipient, the date, time, and location of the original SM; full reciprocal contact information between the Sender and Recipient; the priority or ordering of the message; a title, subject or summary reference for the message; or formatting or transmission-specific information.

Core Text The actual message (text, image, sound recording, or combination of one or more of the three) carrying the expressed meaning.

Close Message Proximity This is the short-range, direct-transmission distance for a Unit, and depends upon the technology for message transmission in a Unit's hardware. It may be within three meters (e.g. for Infrared links); within 10-15 meters (e.g. for Bluetooth); or within a wireless net's local range (e.g. if the Unit includes cellphone capability). The determining element is that the Unit can send a SM directly between a Sending and Receiving Unit without routing the SM through the SMS Central hardware and software.

Cultural Linkages The interpretive model guides constraining and guiding the correct process for deriving the full meaning of a message, both from its Core Text and contextual linkage, and from its Context Metadata, to ensure full communication from the process of sending and receiving the message, that is, that allow the meaning of the expression to be comprehended.

SM=Short Message A human-perceived communication, which typically requires interpretation that in turns requires knowledge of more information than that self-contained within the message, for proper comprehension. For example, the characters "U OWE 4 LNCH" cannot be deciphered using any formal language, even though a moderately-apt human user of slang will readily be able to transform them into the acceptable formal statement, "You owe {me=the message sender} for lunch".

SMS=Short Message Service A system for sending short messages (currently chiefly text, with some voice; potentially graphic, with some data) using existing communications infrastructure (hardware and software) from an input device through a network to one or more recipient devices.

SMS Central At least one general-purpose computer whose hardware and software (including operating system and applications) create a functionally-distinct and functionally-specific machine allowing SM receipt, analysis, storage, comparison, augmentation, response, translation, and forwarding between a number of Sending and Receiving Units, wherein the originating and final versions of each SM is humanly-perceptible and recognizable, although the interim machine-transmitted versions may not be due to compression, coding, encipherment, or programming requirements.

Unit A device for creating, sending, displaying, and receiving Short Messages through wireless communication means, such as a cellular telephone with a display panel, a Blackberry or other SM-specific device, or a pager equipped with a display and entry capabilities.

User A person who uses the SMS to send at least one SM to one or more Recipients; the human whom the technology is assisting keep in contact with friends, acquaintances, coworkers, family, and the rest of the world accessible through the SMS.

Overview

The typical desired use of any SMS is the exchange between already-associated individuals of a meaningful short message (SM) from the Sender that can be correctly interpreted by its Recipient. These messages are generally not merely informal, but also in a slang common to the sender and recipient. Isolated from its context (that is, without any knowledge of sender and recipient, time of message, and associational context), many a SM would be incomprehensible to a third party. This is viewed as a feature, not a bug, by many of the sub-communities (particularly teenagers) who are the heaviest SMS users.

It is possible sometimes to state general rules for deriving the meaning to be garnered from the Core Text. An example of such a general rule, is that if the SM text makes no sense according to formal linguistic rules its individual letters and numerals should be sounded out phonetically and replaced by the closest phonemic, full-language equivalents. Thus, "C U 4 dinner" becomes "See you for dinner"; or, "I OWE U 4 lunch" becomes "I owe you for lunch". Such replacement rules are both culturally differentiated and differentiating and encode (not encipher) meaning into a SM.

Many encoding rules, however, need the SM's Context Metadata to derive the meaning of the Core Text. A first and most basic example is that the Context Metadata includes the human identification of the Sender and the Recipient (as opposed to the machine identification of the Sending Unit and Receiving Unit). The Core Text that simply says, "I owe you for lunch" does not, absent its Contextual Metadata, identify either of the particular individuals to be associated with each of the pronouns. Knowing who is meant by "I" and "you", requires the Context Metadata of 'Sender' and 'Recipient'.

Other Context Metadata may also be needed. For example, if the Core Text says, "I will buy our next dinner", knowing which dinner the sender and recipient are next to eat together is crucial. This may require the date and time of the message's sending; the combined current calendar up to the next joint meal date, or a regular pattern of a group that includes both individuals and a dinner. For example, this message, if sent just after the specified meal on a given date, or after the travel time needed to meet prohibits conjunction until after the standard time for such has passed, generally indicates that the meal will be on the following day at the earliest. Thus, 'C U 4 lunch' sent at 3:00 p.m. generally indicates that the next day's noon-time meal will be shared. Similarly, if the message itself indicated that the sender and recipient were in substantially different geographic locations at the sending early in the day, absent indication that the same people would be in the same location at a later, certain time before the planned meal, the 'dinner' becomes one set after the necessary travel time. Geographic as well as temporal location, and future plans, may become part of the Context Metadata.

Additionally, deriving the correct meaning may well require further knowledge of the cultural norm of the sender and recipient. In some cultures, "dinner" is the mid-day meal; in others, the evening meal; in others, the phrases "dinner" and "supper" may be interchangeable without differentiation; consider, for example, the confusion that can exist from a phrase such as "I'll buy you tea", between American and British, or American and Indian, businessmen.

Finally, deriving the correct meaning may well require further knowledge of the particular patterns and habits of both the Sender and the Recipient. For example, two individuals both knowing the other is a late riser (being night-owl programmers), might well send 'C U 4 lunch' to get together to eat at 6 p.m. that day. But the same message, if sent at 19:00 (seven p.m.) to an East Coast American recipient, only rarely communicates a meal on that day; while if sent mid-summer between two inhabitants of Madrid, Spain, almost certainly communicates that their meeting will take place before the date changes.

Thus, to be properly interpreted, a SM may require in addition to the Core Text the Context Metadata (sender, recipient(s), date and time sent, date and time received), and the cultural linkages for the parties (culture, age, and location) be made available to the recipient. One of the aspects of this invention is that it relieves the sender from having to embed, and the recipient to retrieve, either the Context Metadata or these cultural linkages, thereby lowering their communication burden while assisting the intended interpretation of the meaning of the SM. A second aspect of this invention is that it can prepare consequential future activity(ies) or response(s) appropriate to the received message in light of its intended effect. For example, a SM sent by a spouse on Feb. 13$^{th}$ saying "I LUV U" may generate a 'back-message' reminder to the sender to come home bearing both flowers and a card after the business trip concludes the next day. In effecting these aspects the invention may be described as an ever-helpful social secretary for (otherwise clueless) geeks.

A SMS may also enable communications between people of different subcultures whose limited yet shared contact means include the SMS as one part. Accordingly, another aspect of this invention is providing to either party the means to embed (on the part of the sender) or retrieve (on the part of the recipient) the cultural norms that will assist proper interpretation of the SM. This embedding can be either specific to the particular message, or associational by inclusion of 'norms' from a pre-provided cultural database. In this aspect, the invention may be described as serving as a protocol secretary for non-diplomatic, cross-cultural associations.

A SMS can communicate informal, yet personal and important, messages which may require action or response on the part of the recipient, For example, "HOW R U" ("How are you?") or "ILUVU" ("I love you"), both may well require a response, if only to show that the contact has been received. Accordingly, another aspect of this invention is providing either party the means to embed (on the part of the sender) or retrieve (on the part of the recipient) not only the cultural norms for proper interpretation of the SM itself but also the further norms for proper response (silence, sending of a response, making a personal visit, sending a card or sending flowers) and preparing them in advance of the next contact. In this aspect, the invention may be described as serving as a response-making assistant for the otherwise less-than-perfectly attentive, or simply non-forethoughtful, recipient.

Finally, a SMS can embed its own functionally-directed coding schema to enable previously prepared, contextually-sensitive, short-range, locationally coincidental messaging between parties with prior contacts, obligations, or both, either coincident with contact with the remote and more comprehensive message processing capability or asynchronous updating thereof. In this aspect, the invention may be described as providing co-locationally sensitive, immediate response assistance to a possibly inattentive or overloaded human user unable to instantly process or even detect all nearby perceivable appearances or presences.

Description of the Elements

The Sender is the individual user initiating a SM. He (or she) does so on a Sending Unit, the hardware representing a physical link between human and system.

The Recipient is the intended human target for the SM, and the Recipient receives the SM on the Receiving Unit, itself a physical link between human and system.

It is possible that the Sender and Recipient are the same individual separated by time or time and locational difference (e.g. 'Remind me when in Arlington to visit USPTO').

A Sending Unit transmits a SM, either to SMS Central or, in an alternative embodiment, the Sending Unit may translate between Wireless Access Protocol ('WAP') and Internet Protocol using the HyperText Transfer Protocol ('HTTP'), by translating a WAP POST to a HTTP Post before sending the SM to the SMS. In another alternative embodiment, the Sending Unit may send a response SM previously prepared by the SMS and posted to the Sending Unit, to a Receiving Unit detected by the Sending Unit within its Close Message Proximity (Bluetooth, UWB, or Wireless USB) distance.

For example, any Sending Unit having Close Message Proximity channel capability can have the SMS Central send to it a prepared SM with Context Metadata containing identification particular to that Sending Unit and a particular Recipient. The Sending Unit can constantly test for the presence of a Receiving Unit associated with that particular Recipient within the Sending Unit's Close Message Proximity. When an associated Receiving Unit is detected within the Sending Unit's Close Message Proximity, the Sending Unit can send the previously-prepared, particular Recipient SM. This previously-prepared, Recipient-specific SM may include notification that the SMS can be contacted for interpretative support. Then the Receiving Unit can contact the SMS for any necessary Context Metadata or cultural linkage support at the Recipient's option.

In a further embodiment, if a previously-prepared SM is initiated by co-locality of Sender and Recipient, each unit may test its locality for the presence of the other unit and respond directly, without requiring the SMS Central to handle the exchange, though a copy of the exchange may be sent to the SMS. A database local to each Unit tracks and monitors co-location and correspondence and allows for direct interaction; though full analysis, comparison, and generation for any particular SM would still be handled by SMS. For example, Moe and Curly met for dinner on the first night, with Moe picking up the tab and Curly sending to Moe an SM saying "I O U 4 Dnr $23". The SMS prepares a message for Curly's Sending Unit that says, "CUMGET YR $23" and returns it to be stored on Curly's Sending Unit. At the trade exhibition the next day Moe's Receiving Unit is detected by Curly's Sending Unit within Close Message Proximity, and the prepared SM "CUMGET YR $23" is sent along with Curly's current location. The message and storage could be reversed, so it is Moe's Unit that detects Curly's, the prepared SM reads "U O ME $23 CUM PAY", and it is sent from Moe's to Curly's Unit.

In another, further, embodiment the SMS allows the Sender to explicitly enter Context Metadata and then uses Context Metadata permutations entered by the Sender that allow one or a set of contextual facts (e.g. time, date, location, the presence of specific other Users, or a previously-established pattern or cultural norm) to explicitly govern the sending of prepared SMs. For example, Curly may have prepared his reminding, automated SM to activate if and only if (Moe-within-Bluetooth-range=YES) and (Time is between 5:30 PM-7:30 PM PST); or if (Moe-within-Bluetooth-range=YES) and (Time is between 5:30 PM-7:30 PM PST) and (GPS Location=Los Angeles Airport Hilton, Calif., USA.) Alternatively, if Moe planned a party and used a first SM to contact his friends Larry, Curly and Shemp which read "u ome $12 4 beer if u come. rsvp w/cell #", and all three did RSVP, then Moe could get the SMS to prepare a SM saying "u r here so pay me $12", load it onto Moe's Sending Unit, and as any of Larry, Curly and Shemp arrive within Close Message Proximity—even if Moe's Unit only detects Shemp's cell phone with Shemp's cell phone number—then that person gets the billing message, as their presence and agreement is simultaneously noted by Moe's Unit.

In another embodiment the current GPS location for the Sending Unit is attached as Context Metadata, allowing geographical references to be used when examining or analyzing the SM and responding.

The SMS incorporates at least one central computer (SMS Central) having communications I/O capability for each Sending and Receiving Unit, memory, at least one database, the necessary operating system, and telecommunications and applications software for operation, as is known in the prior art. The SMS preferentially will have direct I/O capability for system monitoring, problem handling, and improvement independent of any particular Sending or Receiving Unit. The SMS also incorporates the software necessary for Core Text representation, storage, and decoding; and to provide Context Linkage, and in a further embodiment, Cultural Linkages analysis.

In a further embodiment the SMS Central includes a Cultural Database with patterns and data specific to the Senders and Recipients, allowing and enabling cross-cultural comparisons and adaptations.

The SMS Central includes the software for analyzing the Core Text, said software having keyword scanning and identification capability and the equivalent of a Finite State Machine (FSM) for variable creation, use, and replacement with binding values. The SMS Central analyzing software also has the capability to use the Context Metadata and Cultural Linkage to provide variable binding and FSM pattern-matching as part of the SM message analysis process.

Additionally, the SMS Central includes software for parsing the Core Text, such software including at least one Language Parser for the human-generated message (as distinct from the machine code representation of the original alphanumeric or iconic symbol string). The SMS Central may include a Language Parser designed for SMS Slang, and a Language Parser for different language representations (e.g. Roman and non-Roman alphabets, ideograms, hieroglyphics and icons), both formal and informal (an example of an informal, Latin-alphabet-punctuation-based 'alphabet' are the common 'emoticons' developed in early text-based Internet precursor implementations, e.g. the smile ( :-) ), big smile ( :-} ), the yell ( :-O ) and frown ( :-( ).

In a further embodiment the SMS Central includes a pattern database for at least one set of cultural norms, whether such be of the Sender, Recipient, or both. In an alternative embodiment the SMS includes multiple databases with translation norms for multiple cultures. This pattern database can also incorporate the evolving set of common norms between a particular Sender and a particular Recipient, or a set of Senders and Recipients, arising from mutual interactions creating this new set of cultural norms through shared joint behavior and message forms. In another alternative, making explicit a determined cultural differentiation by display differentiation such as text color, ring tone, or previously stored choice by sender or recipient of an associated differentiation in representation according to cultural linkage (e.g. putting a briefcase icon before any SM from a 'suit', and a keyboard icon before any SM from a fellow programmer).

In a further embodiment, the SMS Central includes software that allows SM transmission and translation across at least two Alternative Cultural Norms (ACN), whether such be differentiated by the native language of the Sender and Recipient (English←→Japanese), by the geographic locations of the Sender, Recipient, or both, or by the authorizing Unit (e.g. "Fujitsu's Global Hardware Division, Silicon Valley Branch").

In a further embodiment the SMS Central includes software having pattern-completion means which, through decoding and variable binding from one or more SMs, generates suggested responses to a received SM. For example, if a Sender composes and transmits "UOM 45", by comparing the present SM to previous exchanges between Sender and Recipient, SMS Central may generate the suggested inclusion of the currency mark so that the recipient may receive "UOME $45".

In a further embodiment the SMS includes software enabling translation across different media display capabilities. For most SMs, the most common current messaging means is using a hyperlink to context support information) using SMTP over the Internet. However, if the SMS detects that the Receiving Unit is a cell phone (using the Context Metadata), then the SMS may encode and transmit the original SM along with an additional SM notifying the Recipient that contextual support is available from the SMS through a Wireless Access Protocol ('WAP') gateway. The SMS can send the context-support message by using WAP GET, translated to HTTP GET by the Recipient's WAP gateway. The Recipient then may decide whether or not to engage additional software necessary to translate the differential media (sound, graphic, or different alphabet), in the fashion like to that used for current Multi-Media Messaging ('MMS').

This may, for example, be done if the Recipient is a cell number, with the Sending Unit also sending an additional SM notifying the SMS, which then sends to Recipient a further SM, by downloading the context-support message from the SMS using Wireless Access Protocol ('WAP') GET but translating it to an HTTP GET by the WAP gateway, before it reaches MMC.)

In a further embodiment, the SMS Central includes software generating additional linked information that enhances the context available but not specifically incorporated in the original SM. An example of such would the be inclusion of a 'return receipt' SM that would, upon confirmation of a successful transmission to the Receiving Unit, notify the Sender of a completed and therefore now-available communication between Sending and Receiving Units, or in a further embodiment, of actual activation and thus presumed reading of the SM by the Recipient.

In yet a further embodiment, the SMS Central includes software for comparing the Core Text to Third-Party offers stored in the database as open-ended messages to which both Sender and Recipient match the intended offerees of the Third Party, upon analysis of the Core Text, Context Metadata and Cultural Linkages of the SM. For example, Sender's SM may contain Sender's offer to buy lunch for Recipient. The Context Metadata may show that the offer is good within a particular city (e.g. Austin, Tex.) and within a particular date range (Oct. 10-14, 2005). A Third-Party may have already sent a SM to SMS Central, indicating that any SMS user in Austin in October, 2005 can get a 20% discount on a lunch a particular restaurant, chain of restaurants, or set of restaurants. The SMS Central, having matched the time, date, location, and intentions of the particular Sender and Recipient to the Third Party's qualifying criteria, can now add to Sender's original SM the Third Party's offer, and copy back from SMS Central to the Sending Unit the same offer from the Third Party, with both Sender and Recipient both being notified that the Third Party's offer has been made common knowledge between the three Users.

In yet a further embodiment the SMS includes software that measures the entire SM, including the Core Text, Context Metadata, and Cultural Linkages, against formalization norms contained in the database to determine the extent to which the SM matches any such norm and thus can be said to have committed the Sender to an informal contract, formal contract, or fully-binding and even assignable commitment.

A distinct further extension of this invention allows the SMS to suggest a response that will match one or more partially-completed formal norms. A further extension of this invention allows the SMS to send at least one additional message to the parties, signaling the completion of any formal norm. Another further extension of this invention allows the SMS to analyze and compare the partially-created pattern against a matching set of potential completed patterns and suggest one or more inferential further steps that would complete such pattern. A yet further extension allows the SMS to indicate when the absence of any overt responsive effort will passively allow, through automatic means—for example, those requiring no further action by the Sender such as the passage of time—the creation of a formalization norm. A yet further extension allows the SMS to store a completed formalization norm and to allow each of the parties to consult the SMS to examine the state of all relevant stored formalization norms involving that party.

This invention expressly disclaims the field of forming, through its own activities, any such binding formal commitment without the active participation and interpretation of the results by the minimum set of sender(s) and recipient(s), as the focus of this invention is on supporting the less-than-formal commitments and ties which join individuals into a community, despite differences in language, communication means, or cultural contexts. In yet a further extension to this invention, the SMS may offer the party closest to converting the less-than-formal commitment into a final commitment, advice as to either strengthening, or deliberately removing, such from the dealings between the two parties.

In a further extension to this invention, when a culturally-supported, even though less than formal commitment has been instantiated through the SMS, it additionally provides both an explicit record of the less-than-formal commitment, and can link the sender, recipient, or both to the goods and services of a third party who may wish to offer the same to the communicants.

Best Mode

A Sender uses his Sending Unit to send an SM to a Recipient(s). Upon receiving a SM the SMS Central decodes the message data, stores the message data to an array, parses the data array according to specified headers, and extracts selected information (i.e. destination address, message keywords, date and/or time stamps) that generates the Context Metadata.

Both the Core Text and Context Metadata are associated with the Sender and Recipient(s) and stored in a database, and forwarded to the Recipient(s) using standard SMS messaging means, including forwarding text messages to graphic displays and/or substituting voice for text or text for voice messages according to the receiving unit(s) functionality. No claim is made for either the message forwarding or use of substitute media by the SMS, as each is believed established in the prior art.

The extracted data is run through software which analyzes and stores associations created by the SM to the database. The combined Core Text and Context Metadata are compared to existing patterns, seeking to match other unfilled message pattern needs; if a match is made, then the additional pattern, in the form of its Context Metadata and Core Text, is both associated with the SM and sent back to the Sender.

If a translation (across media, hardware, or cultural linkage) has been made, then a message indicating the availability of context support by the SMS is also sent to the Recipient(s). At the request of the Recipient, the Context Metadata will be both translated into the same form as the Core Text and explicitly displayed in association with the Core Text.

For example, Joe, upon receiving a voicemail message saying, "Hello, Joe", send from Ed to Joe could ask for its display in the form "From Ed: 'Hello, Joe'; message sent 9:57 AM PDT from Santa Maria, Calif." If Joe specified the message was to appear in text on his pager display (Joe being in court), the text could scroll across the pager's display; or if Joe specified that the message was to be made vocally, a speech synthesizer would replace Ed's Core Text with a synthesized voice—which might be associated by Ed with his message, or by Joe with Ed's name.

The SMS software further analyzes the combined Core Text and Context Metadata according to the Cultural Linkages associated with the Core Text. This association may be specified by the Sender, specified by the Recipient; or may be inferred by the SMS from prior associational linkages previously established between the Sender and Recipient (i.e. from this Ed and to this Joe). This analysis compares the combined Core Text, Context Metadata, and Cultural Linkages against pre-existing patterns identified in the SMS database; seeks out matches; and ranks matches found by relative strength of match. Finally, the combined Core Text and Context Metadata are run through the SMS software analyzing the Cultural Linkages appropriate to each of the Sender and Recipient(s) and, to the extent that a translation is made a notice to both Sender and Recipient(s) thereof is prepared and sent to the respective Units.

Finally, if the SMS software detected a pattern matching a formalization norm (such as being the final message in a four-part exchange of offer, counter-offer, counter-counter offer, and final acceptance), then the SMS sends notification of meeting such a formalization norm to the Sender and Recipient.

While this invention has been described in reference to illustrative embodiments, this description is not to be construed in a limiting sense. Various modifications and combinations of the illustrative embodiments as well as other embodiments of the invention will be apparent to those skilled in the art upon referencing this disclosure. It is therefore intended this disclosure encompass any such modifications or embodiments. Furthermore, the scope of this invention includes any combination of the elements from the different embodiments disclosed in this specification, and is not limited to the specifics of the preferred embodiment or any of the alternative embodiments mentioned above. Individual user configurations and embodiments of this invention may contain all, or less than all, of the elements disclosed in the specification according to the needs and desires of that user. The claims stated herein should be read as including those elements which are not necessary to the invention yet are in the prior art and are necessary to the overall function of that particular claim, and should be read as including, to the maximum extent permissible by law, known functional equivalents to the elements disclosed in the specification, even though those functional equivalents are not exhaustively detailed herein.

Although the present invention has been described chiefly in terms of the presently preferred embodiment, it is to be understood that the disclosure is not to be interpreted as limiting. Various alterations and modifications will no doubt become apparent to those skilled in the art after having read the above disclosure. Such modifications may involve other features which are already known in the design, manufacture and use of Short Message Systems, both hardware and associated software therefore, and which may be used instead of or in addition to features already described herein. The examples herein are not limiting but instructive of the embodiment of the invention, and variations which are readily derived through programming or embedded hardware transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived there from.

I claim:

1. A computer-implemented method comprising:
parsing a Short Message with a Server;
generating a Context Metadata of the Short Message; and,
associating explicitly the Context Metadata to the Short Message; and,
delivering the Short Message and its Context Metadata.

2. The method as in claim 1 further comprising:
translating between a Wireless Access Protocol ('WAP') and an Internet Protocol by translating a WAP POST to a HTTP POST before sending the Short Message from the WAP Unit to the Server; and
translating a WAP GET to a HTTP GET before sending any Short Message from a Server to a WAP Unit.

3. A The method as in claim 1, further comprising:
allowing a Sender to explicitly enter the Context Metadata; and,
using a permutation of the Context Metadata entered by the Sender to explicitly govern a sending operation of a prepared Short Message.

4. The method as in claim 1, further comprising:
attaching a current Global Positioning System (GPS) location of the Sender as the Context Metadata.

5. The method as in claim 1 further comprising:
storing the Short Message and the Context Metadata;
identifying the Sender;
comparing the Sender against a database containing a previous Sender;
incorporating the Sender into the database;
identifying a Recipient;
comparing the Recipient against a database containing a previous Recipient;
incorporating the Recipient into the database;
analyzing a parsed Short Message and the Context Metadata to identify at least one key token;
comparing each identified key token against a database containing a previous key token, said database containing each previous key token and an association between each key token and the Sender;
incorporating into the database each identified key token the association between each key token and the Sender;
analyzing the parsed Short Message and the Context Metadata to identify at least one message structure pattern;
comparing each identified message structure pattern against a database of previous message structure patterns, said database containing each previous message structure pattern and a respective association between the respective association and the Sender; and,
incorporating into the database each identified message structure pattern and the respective association.

6. The method as in claim 5, further comprising:
searching through the database for a offer matching at least one key token, the offer coming from a third party; and,
matching at least one key token with the offer;
attaching the offer to the Short Message and the Context Metadata;
sending the Short Message and the Context Metadata and the offer to the Recipient;
creating a duplicate of the Short Message and the Context Metadata with an attached offer; and,
sending the duplicate of the Short Message and the Context Metadata with the attached offer back to the Sender.

7. The method as in claim 6, further comprising:
searching the database for each offer matching at least a message structure pattern of the Short Message, each said offer coming from a third party; and, upon finding any offer matching at least a message structure pattern of the Short Message:
attaching the offer to the Short Message and the Context Metadata;
sending the Short Message and the Context Metadata and the offer to the Recipient;
creating a duplicate of the Short Message and the Context Metadata with the attached offer; and,
sending the duplicate of the Short Message and the Context Metadata with the attached offer back to the Sender.

8. The method as in claim 6, further comprising:
searching the database containing the previous Senders periodically and for each previous Sender:
retrieving each stored Short Message and the Context Metadata sent by the Sender;
passing a retrieved Short Message and the Context Metadata sent by the Sender through a text analyzer;
analyzing the text and Context Metadata;
identifying a date and a time element of the Short Message;
comparing the current date and time to the date and the time element of the Context Metadata; and,
determining whether the text and Context Metadata represents an uncompleted commitment, and if so;
generating a follow-up message; and,
sending a follow-up message to the Sender.

9. The method as in claim 8, further comprising:
identifying a User who is responsible for taking action at or before a particular date and time; and, upon determining that the text and Context Metadata represents an uncompleted commitment, the Server generates and sends the follow-up message to that User.

10. The method as in claim 1, wherein the step of processing the Short Message through at least one Server further comprises: further comprising:
analyzing the Short Message and an associated Context Metadata for a Cultural Linkage by comparing the Short Message and the associated Context Metadata to a Cultural Database with a pattern and a data specific to a User of the Short Message Service.

11. The method as in claim 10,
wherein the Server includes at least two different Cultural Databases; and further comprising
comparing the Short Message and the associated Context Metadata to each Cultural Database with patterns and data specific to the User of the Short Message Service until finding a Sender's Cultural Database containing the closest match to the Sender;
comparing the Short Message and associated Context Metadata to each Cultural Database with patterns and data specific to Users of the Short Message Service until finding a Recipient's Cultural Database containing the closest match to the Recipient; and,
comparing the Short Message according to a translation norm for translating the Short Message from the Sender's Cultural Database to the Recipient's Cultural Database.

12. The method as in claim 11, further comprising:
incorporating an evolving set of common norms between a particular Sender and a particular Recipient arising from mutual interactions creating this new set of cultural norms through shared joint behavior and message forms.

13. The method as in claim 11 further comprising:
making explicit a determined cultural differentiation by display differentiation according to a cultural linkage.

14. The method as in claim 1, wherein the step of parsing the Short Message further comprises using a Language Parser designed for a Short Message Service Slang.

15. The method as in claim 14 further using a Language Parser for different language representations including at least two distinct language representations.

16. The method as in claim 15, wherein a first language representation is for a standard alphabetic language and a second language representation is an informal, character-derived, compilation of a known emotional associations of a particular punctuation grouping.

17. The method as in claim 11 further comprising using a software application that allows a Short Message transmission and a Short Message translation across at least two Alternative Cultural Norms.

18. The method as in claim 17, wherein the Short Message transmission and the Short Message translation across at least two Alternative Cultural Norms comprises using software that allows the Short Message transmission and the Short Message translation across at least two different human languages.

19. The method as in claim 17, wherein the Short Message transmission and the Short Message translation across at least two Alternative Cultural Norms comprises using an other software application that allows the- Short Message transmission and the Short Message translation across at least two different Alternative Cultural Norms distinguished by a respective geographic location of the Sender and the Recipient.

20. The method as in claim 5, further comprising:
using a pattern-completion software application to decode and to variable bind from one or more Short Messages and
generating a suggested response to a received Short Message.

21. The method as in claim 5, further comprising:
using a software enabling translation across a different media display capability.

22. The method as in claim 21, wherein the step of using the software enabling translation across the different media display capability comprises, for translating between an Internet and a cellphone Short Message: when moving from a Wireless Access Protocol ('WAP') to the Internet: for each WAP GET, substituting a HTTP GET; and, for each WAP POST, substituting a HTTP POST; and, when moving from Internet to WAP: for each HTTP GET, substituting a WAP GET; and, for each HTTP POST, substituting a WAP POST.

23. The method as in claim 22, further comprising sending to the Recipient a further Short Message by downloading the context-support message from the Short Message Service.

24. The method as in claim 5, further comprising:
generating an additional linked information that enhances the context available but is not specifically incorporated in the original Short Message.

25. The method as in claim 24, wherein the step of generating additional linked information that enhances the context available but is not specifically incorporated in the original Short Message further comprises including a 'return receipt' Short Message that would, upon confirmation of a successful transmission to the Receiving Unit, notify the Sender of a completed and therefore now-available communication between a Sending Unit and a Receiving Unit.

26. The method as in claim 25, further comprising sending the 'return receipt' Short Message to the original Sender upon actual activation, and thus presumed reading, of the Short Message by the Recipient.

27. The method as in claim 5 further comprising: comparing the Core Text to Third-Party offers stored in the database as open-ended messages to which both Sender and Recipient match intended offers of the Third Party, upon analysis of the Core Text, Context Metadata and Cultural Linkages of the Short Message.

28. The method as in claim 5, further comprising: measuring the entire Short Message, comprising the Core Text, the Context Metadata, and the Cultural Linkages, against a formalization norm contained in the database to determine the extent to which the Short Message matches any such formalization norm.

29. The method as in claim 28, further comprising allowing the Short Message Service to suggest a response matches one or more partially-completed formal norms.

30. The method as in claim 28, further comprising allowing the Short Message Service to send at least one additional message to signal the completion of any formal norm.

31. The method as in claim 28, further comprising the Short Message Service:
analyzing and comparing the partially-created pattern against a matching set of potential completed patterns; and,
suggesting for each potential completed pattern at least one inferential further step that would complete that potential completed pattern.

32. The method as in claim 28, further comprising allowing the Short Message Service to indicate when an absence of any overt responsive effort to passively allow the creation of a formalization norm.

33. The method as in claim 28, wherein the Short Message Service, after processing the Short Message, offers the party closest to converting the less-than-formal commitment into a final commitment, an advice as to either strengthening, or removing, such from the dealings between the two parties.

34. The method as in claim 5, wherein the step of processing the Short Message through at least one Server further comprises, when a culturally-supported even though less than formal commitment has been instantiated through the Short Message Service, having the Short Message Service provide both an explicit record of the less-than-formal commitment, and link the Sender and the Recipient to a good and a service of a third party.

35. A computer-implemented method whereby a Short Message Service provides contextual support for a social obligation, said method comprising:
storing on a first Unit a Short Message intended for at least one particular Recipient, said the Short Message having already been:
previously prepared by and sent from a Server; and,
associating a Core Text and a Context Metadata;
detecting a Receiving Unit that the Context Metadata indicates to be within a Close Message Proximity of the first Unit and associated with the particular Recipient;
communicating the Short Message to the Receiving Unit; and,
communicating to the Server a notification that the Short Message has been sent to the particular Recipient.

36. The method as in claim 35, further comprising adding to the Short Message a notification that the Short Message Service can be contacted for interpretative support.

37. The method as in claim 35, further comprising: allowing each of the first Unit and a second Unit to test a respective locality for the presence of a different Unit; and, upon detection of a mutual Close Message Proximity, permitting direct exchange of the Short Message Service between the first Unit and the second Unit without requiring a Short Message Service Central to handle the exchange.

38. The method as in claim 37, further comprising: sending to the Server a copy of each Short Message plus a associated Context Metadata directly exchanged between the first Unit and the second Unit; and, processing the Short Message the Server, said processing further comprising:
  parsing the Short Message;
  generating the Short Message Context Metadata; and,
  associating explicitly the Context Metadata to the Short Message.

* * * * *